April 20, 1937.   R. S. CONDON   2,078,124
MECHANISM FOR REMOVING BURRS FROM GEARS
Filed May 15, 1934   2 Sheets-Sheet 1

Inventor
Robert S. Condon
By
B. Schlesinger
Attorney

April 20, 1937. R. S. CONDON 2,078,124
MECHANISM FOR REMOVING BURRS FROM GEARS
Filed May 15, 1934 2 Sheets-Sheet 2

Inventor
Robert S. Condon
By B. E. Shlesinger
Attorney

Patented Apr. 20, 1937

2,078,124

UNITED STATES PATENT OFFICE 2,078,124

MECHANISM FOR REMOVING BURRS FROM GEARS

Robert S. Condon, Rochester, N. Y., assignor to Gleason Works, Rochester, N. Y., a corporation of New York Application May 15, 1934, Serial No. 725,719

21 Claims. (Cl. 90—1)

The present invention relates to mechanism for removing the burrs which are produced by the cutting tool in the operation of forming the teeth of a gear. In a more particular aspect, the present invention relates to mechanism for removing the burrs from spiral bevel and hypoid gears.

Heretofore it has been the practice to remove the burrs after the teeth have been cut and in a special operation. Ordinarily the burrs have been removed by filing them off manually, but in come cases special burr-removing machines have been employed for the purpose. Either operation is expensive and requires a separate handling of the gear.

The primary purpose of the present invention is to eliminate the separate burr-removing operation and to provide mechanism whereby the burrs may be removed from a gear during cutting.

Another object of the invention is to provide a burr-removing mechanism which is operable simultaneously with mechanism for chamfering the teeth of a gear and which may be used either on a gear chamfering machine or on a gear cutting machine to permit effecting the burr removing operation simultaneously with the chamfering of the ends of the teeth of a gear. In this connection, still another object of the invention is to provide a burr-removing mechanism which can be operated in conjunction with a chamfering mechanism of known construction to permit removing the burrs from the end of each tooth space and chamfering one side of such tooth space immediately after the tooth space has been cut and in the interval when the cutting tool is withdrawn from engagement with the blank to permit indexing the blank.

Still another object of the invention is to provide a burr-removing mechanism which can be mounted on chamfering mechanisms of known construction in such wise that the movement of the chamfering tool will provide the power for actuating the burr-removing mechanism.

In one form, the present invention constitutes an improvement over the inventions of Maxwell H. Hill, covered in his Patent No. 1,932,781 of October 31, 1933 and in his pending application Serial No. 584,190 of December 31, 1931. The Hill patent and application cover chamfering attachments for spiral bevel and hypoid gear cutting machines which permit of chamfering the teeth of such gears while a gear is being cut. The present invention provides a burr-removing attachment, which is operable simultaneously with the chamfering mechanisms and which, when used on a gear cutting machine equipped with chamfering mechanism operating according to the Hill inventions, permits of cutting the teeth of a gear, chamfering those teeth, and removing the burrs all in one operation, on a single machine, with but one handling of the gear and without any loss of time over the gear-cutting operation itself.

In the chamfering mechanisms of the Hill inventions, the chamfering cut is effected by movement of the chamfering tool in a path oblique to a side and an end face of a tooth of the gear. In the preferred form of the present invention, the burr-removing tool is secured in a tool block that is pivotally mounted on the same arm or slide that carries the chamfering tool of the Hill apparatus and is so positioned thereon that, as the chamfering tool makes its stroke in the oblique direction, the burr-removing tool engages the end of a tooth space and is forced to travel across the end of this space to scrape off the burr while the chamfering tool itself is removing the corner of the tooth bounding the tooth space.

The principal objects of the present invention have been described above. Other objects of the invention will be apparent hereinafter from the specification and from the recital of the appended claims.

A preferred embodiment of the present invention has been illustrated in the accompanying drawings in which:

Fig. 1 is a fragmentary view showing a burring mechanism constructed according to the present invention mounted upon one arm of a double-ended chamfering apparatus constructed according to the Hill application above mentioned and illustrating the relative positions in a gear cutting machine of known construction, to which the chamfering and burr-removing apparatuses are attached, of face-mill gear cutter, gear blank, and chamfering and burr-removing tools at the moment that the chamfering and burr-removing tools are about to take their cuts;

Figure 7:
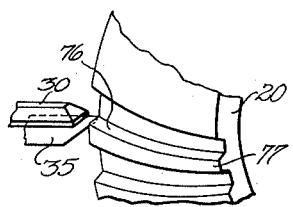
Figure 8:
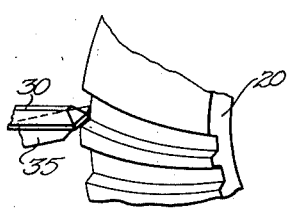
Figure 9:
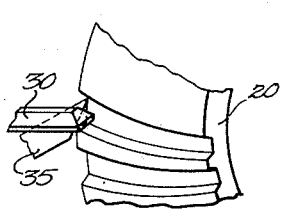
Figure 2:
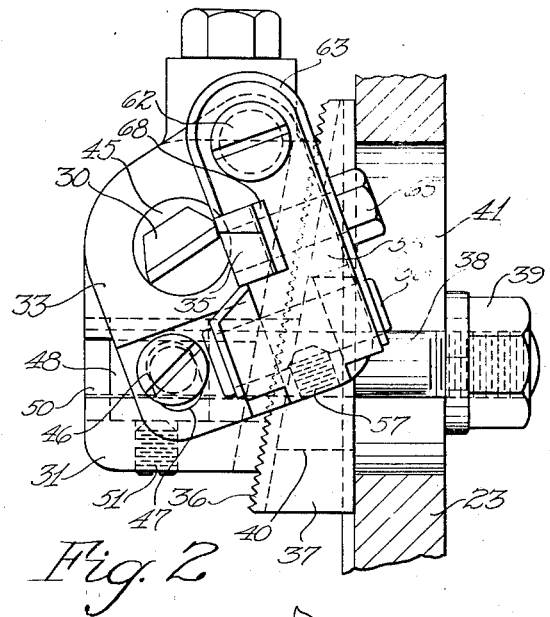
Fig. 2 is an enlarged fragmentary view showing the burr-removing attachment of the present invention and the manner in which it is mounted on one of the chamfering arms shown in Fig. 1, the view being taken at right angles to the view of such arm in Fig. 1.
Figure 3:
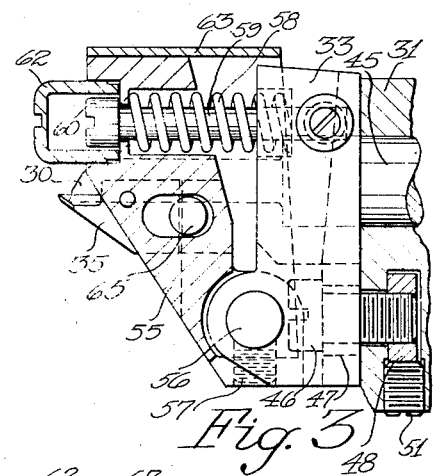
Fig. 3 is a view looking at one side of the burring-tool block of Fig. 2, part of the block being broken away and shown in section.
Figure 4:
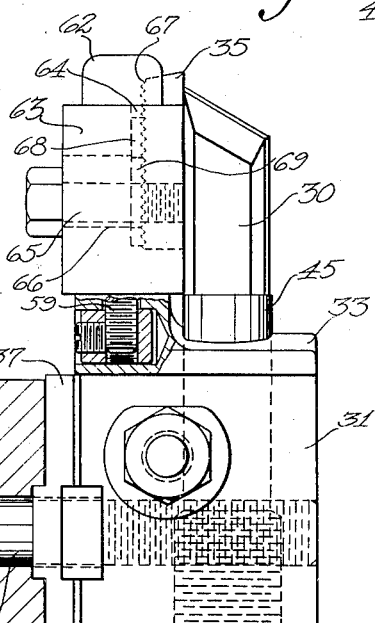
Fig. 4 is a plan view of the parts shown in Fig. 2.

Figs. 7, 8 and 9 are plan views illustrating respectively successive positions of the chamfering and burr-removing tools at successive stages of a chamfering and burr-removing operation on one of the tooth spaces of a gear blank; and Figs. 10, 11, 12 and 13 are somewhat enlarged plan views further illustrating, respectively, successive positions of the burr-removing tool in the burr-removing operation.

In the chamfering mechanism of the Hill application above mentioned, a pair of swinging arms are provided. Each of these arms carries a chamfering tool, one tool being intended to chamfer one end of a tooth at one side of a tooth space and the other tool being intended to chamfer the opposite end of the tooth at the other side of the tooth space. The arms are so arranged relative to the gear blank and so operated that, when the gear cutting tool has cut a tooth space of the blank and has been withdrawn, the chamfering tools are moved simultaneously from opposite ends of the gear toward the center thereof in directions oblique to the ends and sides of the tooth space to effect simultaneously their chamfering cuts.

Figure 1:
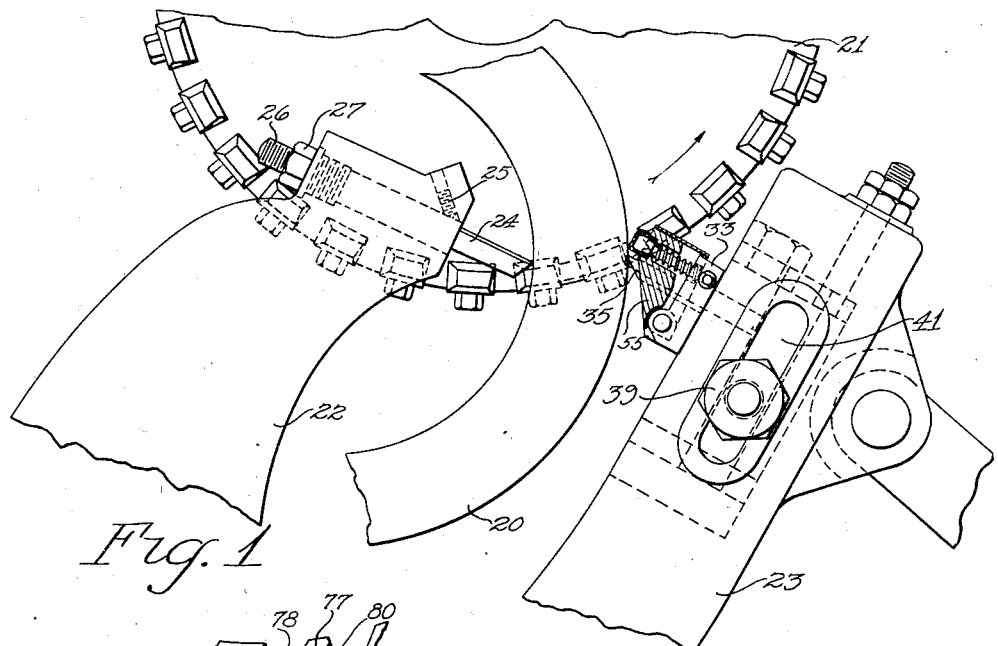

In Fig. 1 of the drawings, 20 designates a tapered gear blank which is to be cut and chamfered and from which the burrs left by the cutting operation are to be removed. 21 denotes a face-mill gear cutter for cutting the tooth spaces in the blank. 22 and 23 are the pair of swinging arms carrying the chamfering tools 24 and 30, respectively.

The tool 24, which is adapted to chamfer the inner ends of the gear teeth, is mounted directly in the arm 22, being secured therein by the set-screw 25 and being adjustable therein by the screw 26 and nut 27, as described in the Hill application. The chamfering tool 30, for chamfering the outer ends of the gear teeth, is secured in a block 31 that is adjustably mounted on the arm 23.

The block 31 differs somewhat in construction from the corresponding block shown in the Hill application, due to the fact that this block 31 is constructed according to the present invention to carry a second block 33 on which is mounted a burr-removing tool 35.

The inside face of the block 31 is serrated to cooperate with the serrated outer face of a wedge 37 which is interposed between the block 31 and the arm 23. The block 31 is secured to the arm 23 by a bolt 38 and a nut 39. The bolt 38 threads into the block 31 and passes through aligned slots 40 and 41 in the wedge 37 and arm 23, respectively.

By loosening the nut 39, then, the wedge 37 can be adjusted to adjust the chamfering tool 30 laterally with reference to the arm 23. The purpose and function of this adjustment has been clearly described in the Hill application and need not further be described here.

The block 33, which carries the burring tool 35, is angularly adjustable on the chamfering tool block 31. This adjustment is about the axis of the shank 45 of the chamfering tool 30, and for the purpose of this adjustment the block 33 is bored cylindrically to fit over and receive the cylindrical shank 45 of the chamfering tool. The block 33 has a plane rear face that seats against the plane front face of the block 31. The block 33 is secured to the block 31 by a screw 46, which passes through an elongated slot 47 in the block 33 and threads into a nut 48. The nut 48 is mounted to slide in an elongated slot 50 in the block 31. The slots 47 and 50 permit of free angular adjustment of the block 33 on the shank 45 of the chamfering tool 30, when the screw 46 is unthreaded to loosen the nut 48. A set-screw 51, that threads into the block 31, is provided to lock the nut 48 against movement in the slot 50, after the block 33 has been adjusted on the block 31 and the screw 46 has been threaded up.

The chamfering tool 35 itself is secured in a tool block 55 that is pivotally mounted on the block 33. The tool block 55 rocks on the pin 56 which is secured by a set-screw 57 in an ear formed on the block 33 and which passes through aligned openings in ears formed on the block 55 at either side of the ear on the block 33.

The tool block 55 is pressed outwardly about its pivot 56 to hold the burr-removing tool in cutting position, by a coil spring 58. This spring is interposed between the block 55 and the block 33 and is mounted on the shank of a T pin 59 that is pivotally mounted in the block 33. The shank of this pin 59 extends through a hole in the block 55 and the head 60 of this pin engages the outer face of the block 55 to limit the forward swing of the block under actuation of the spring 58.

A thimble 62 that is secured in the block 55 guards the head of the pin 59. A guard 63 is secured to the block 55 to extend over the opening between the block 55 and the block 33.

The burr-removing tool is secured in a slot 64 in the tool block 55 by a bolt 65. The bolt threads into the tool and its shank passes through an elongated slot 66 in the block 55. The head of the bolt engages over the guard 63 so that when the bolt is threaded up to secure the tool 35 in position it also secures the guard 63 in position.

The inside face 67 of the burr-removing tool is serrated to engage a serrated shim 68 that is mounted in the slot 65 in the tool block 55.

The shim 68 has an elongated slot 69 formed therein for the passage of the bolt 65 therethrough. The tool 35 may be adjusted longitudinally in the slot 64 to have its cutting edge project the desired distance beyond the block 55 and the slots 66 and 69 in the block 55 and shim 68, respectively, permit of this adjustment while the serrated shim 68 serves to hold the tool more securely when the bolt 65 is tightened up after adjustment.

A gear cutting machine provided with the burr-removing attachment of the present invention may operate in the same cycle of operation as described in either the Hill application or the Hill patent above mentioned. That is, the face-mill gear cutter 21 may be first fed into the gear blank 20 to cut a tooth space in the blank, then the cutter may be withdrawn and the blank chamfered and indexed. The burr-removing operation will also take place during the period of withdrawal and is effected simultaneously with the chamfering. Chamfering and burr-removing may precede the indexing as in the Hill application above mentioned, or may follow the indexing as in the Hill patent. After the burr-removing, chamfering and indexing operations have been completed, the cutting tool 21 is again fed into depth to cut the next tooth space of the blank and the operations proceed as before until all of the teeth have been cut and chamfered and until all of the burrs have been removed from the gear. Then the completed gear is removed from the machine and a new blank may be chucked thereon.

In setting up a machine, provided with chamfering and burr-removing mechanisms such as shown in the accompanying drawings, prior to operation upon a gear blank, the arms 22 and 23 and the chamfering tools 24 and 30 are adjusted relative to the gear blank 20 in the manner described in the Hill application so that in their swinging movements the tools 24 and 30 may move about axes substantially perpendicular to the root surface of the gear blank and in directions oblique to the ends and sides of the gear teeth on which they are to operate, thereby to properly chamfer the teeth. The block 33 is adjusted angularly on the chamfering tool block 31 so as to position the burr-removing tool 35 in such way as to correctly effect the burr-removing operation as will now be described.

Figure 5:
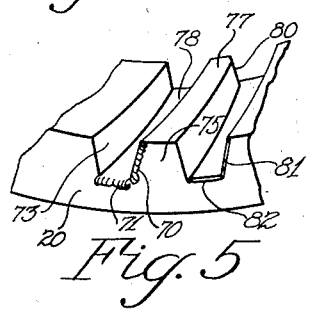
Fig. 5 is a fragmentary perspective view of a bevel gear blank while in process of being cut on a machine of the type illustrated in Fig. 1, and showing a tooth slot that has been cut, chamfered and has had the burr removed, and another tooth slot immediately after cutting but before chamfering and removal of the burr.

Fig. 5 shows a fragment of the gear blank 20 at one stage of the operations thereon. The face-mill gear cutter 21 is supposed to be rotating in the direction indicated by the arrow in Fig. 1 so that it cuts from the inner ends of the gear teeth outwardly and leaves burrs denoted at 70 and 71, respectively, at the outer ends of the concave side and of the bottom of each tooth space 72. With the spiral angles ordinarily employed in spiral bevel and hypoid gears for automotive drives and when the cutter is rotating in the denoted direction, the obtuse angle between the convex side 73 of the gear teeth and the outer ends of the teeth is so large that the face mill cuts clean on the convex side of the tooth space and leaves no burrs on that side. If the face-mill were cutting from the outside of the gear inwardly, burrs would be left on the convex side of the tooth space and at the bottom of the tooth space at the inside ends thereof, but there would be no burr left at the inside end of the concave side of the tooth space.

The purpose of the present invention is to remove the burr formed at the bottom of the tooth space simultaneously with the removal of the burr formed on the sides of the tooth space and the chamfering of the ends of the teeth at the acute corners thereof. The burr-removing tool 35 is, therefore, positioned so that as the chamfering tools 30 is swung inwardly by movements of the arm 23, the burr-removing tool 35 will engage the outer end of the gear and scrape off the burr 71.

Figure 6:
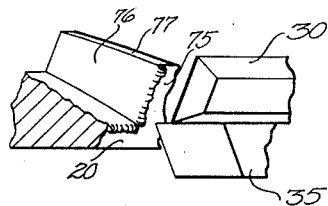
Fig. 6 is a fragmentary diagrammatic view looking at the outer end of the second tooth slot of the gear of Fig. 5 and showing the positions of the chamfering and burr-removing tools as they are about to take their cuts.

Fig. 6 shows the relative positions of the tools 30 and 35 as they begin to take their cuts, and Figs. 7 to 9 inclusive illustrate successive steps in the chamfering and burr-removing operations. The tool 30 moves inwardly in a direction oblique to the outer end 75 and concave side 76 of the gear tooth 77. The burr-removing tool 35 is positioned slightly ahead of the chamfering tool 30 so that it will have time to complete its cut in the stroke of the chamfering tool arm 23. As the arm 23 is swung inwardly, then the burr-removing tool 35 strikes the gear blank first as shown in Fig. 7 and at a point below the already cut tooth space 72. The burr-removing tool does not cut into the solid blank, but as the chamfering arm 23 continues to move inwardly, the tool 35 swings about the axis of the pin 56, causing its cutting edge to move circumferentially around the blank.

Fig. 8 shows the positions of the burr-removing and chamfering tools when the arm 23 has swung far enough to bring the chamfering tool into cutting position. The burr-removing tool 35 has swung about its pivot 56 and is scraping off the burr 71.

Fig. 9 shows the positions of the two tools at the inner limits of movement of the chamfering arm 23. The chamfering tool 30 has completed its stroke, chamfering the corner of the tooth 77 and removing the burr 70, and the burr-removing tool 35 has completely removed the burr from the bottom end of the tooth space.

The action of the burr-removing tool is further illustrated on an enlarged scale in Figs. 10 to 13.

Figure 10:
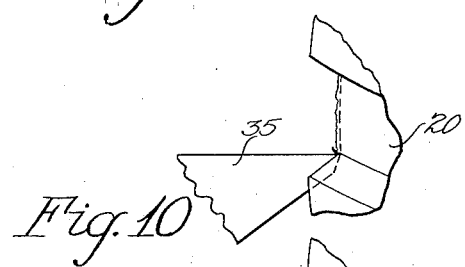
Figure 11:
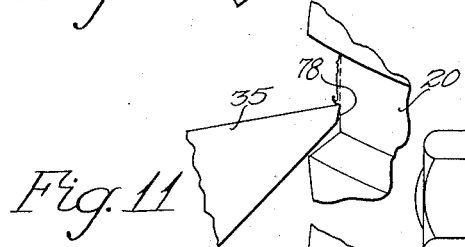
Figure 12:
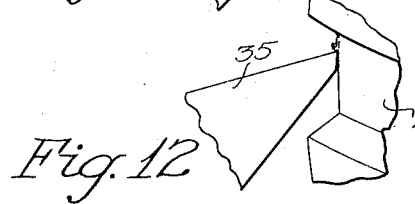
Figure 13:

Fig. 10 shows the burr-removing tool at the beginning of its cut, Figs. 11 and 12 at successive intermediate stages in its action, and Fig. 13 shows the tool when the burr-removing action has been completed.

The tip of the burr-removing tool is formed with a flat 78 back of the cutting edge as clearly shown in Figs. 10 to 13 so that as the chamfering tool moves inwardly, the burr-removing tool may rock on this flat as shown in Fig. 13, and its cutting edge may move outwardly at the end of the burr-removing operation instead of digging into the gear blank.

In Fig. 5 one of the tooth spaces is shown after the completion of the chamfering and the burr-removing operations. The inner end of the convex side of the tooth has been chamfered, as indicated at 80, by the tool 24, and the outside end of the concave side of the tooth space has been chamfered by the tool 30, as indicated at 81, while the burr has been removed from the outer end of the tooth space at the bottom thereof by the burr-removing tool 35 as indicated at 82.

While the invention has been described in connection with removing of burrs from longitudinally curved tooth gears it will be understood that by a suitable modification, apparatus may be provided, constructed according to the present invention, for removing burrs from other forms of gears. Further, while the invention has been described in connection with the removal of burrs from the outer ends of the tooth spaces of a gear, by mounting a suitable block and burr-removing tool on the arm 22, it will be readily understood that burrs could be removed as readily from the inner ends of the teeth were the cutting tool cutting from the outside of the teeth inwardly, by simply mounting a block similar to the block 55 upon the arm 22. In general it may be said that while the invention has been described in connection with a particular embodiment and a particular use therefor, it is to be understood that the invention is capable of various further embodiments and uses and this application is intended to cover any variations, uses or adaptations of the invention following the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. The combination in a gear-cutting machine with means for cutting the tooth spaces, of means operable, in timed relation with the cutting means and after each tooth space is cut, to chamfer a side of the tooth space and remove the burr formed at the bottom of the tooth space at one end of the gear.

2. The combination in a gear-cutting machine with means for cutting the teeth, of separate means operable simultaneously with one another to chamfer a side of a tooth space and to remove the burr formed at the bottom of the tooth space at one end of the gear.

3. The combination in a gear-cutting machine provided with a cutting tool, means for actuating the same, means for alternately feeding the cutting tool into the gear blank and withdrawing the same from engagement therewith, and means for indexing the blank during each period of withdrawal, of means, also operative during each period of withdrawal for chamfering a side of a tooth space previously cut and for removing the burr formed at the bottom of the tooth space at one end of the gear.

4. The combination in a gear-cutting machine of means for cutting the teeth, a movable tool-support, a chamfering tool secured on said tool support in position to chamfer an end of the teeth on movement of said support, means for moving the tool support to move the chamfering tool in a direction oblique to an end face and a side face of the teeth, and a burr-removing tool movably mounted on said tool support in position to engage an end surface of the gear and move along the same as the tool support is moved and means for actuating said tool support.

5. The combination in a gear-cutting machine of means for cutting the teeth, a movable tool-support, a chamfering tool secured on said tool support in position to chamfer an end of the teeth on movement of said support, means for moving the support to move the tool in a direction oblique to an end face and a side face of the teeth, a burr-removing tool mounted on said tool support in position to engage an end face of the gear and pivot about an axis inclined to the direction of movement of the tool support whereby to cause the burr-removing tool to move along said end face of the gear as the tool support is moved, and means for actuating said tool support.

6. A combined chamfering and burr-removing apparatus for gears comprising a movable support, a chamfering tool mounted thereon, means for actuating said support to cause the chamfering tool to effect the chamfering operation, and a burr-removing tool movably mounted on said support in position to engage an end face of a gear and move along the same to remove burrs from said gear as the support is moved to effect the chamfering operation.

7. A combined chamfering and burr-removing apparatus for gears comprising a swinging arm, a chamfering tool mounted thereon, means for actuating said arm to cause the chamfering tool to take its cut in a direction oblique to an end face and a side face of a tooth of a gear, a burr-removing tool movably mounted on said arm, and means for resiliently holding the burr-removing tool in operative position, said burr-removing tool being so mounted as to engage the said end face of the gear and cut circumferentially along said end face as the arm swings to effect the chamfering operation.

8. A combined chamfering and burr-removing apparatus for gears comprising a swinging arm, a chamfering tool mounted thereon, means for actuating said arm to cause the chamfering tool to take its cut in a direction oblique to an end face and a side face of a tooth of a gear, a burr-removing tool pivotally mounted on said arm for movement about an axis inclined to the direction of movement of said arm, and means for resiliently holding the burr-removing tool in operative position, said tool being so positioned on the arm as to engage an end face of the gear and cut circumferentially along said end face as the arm swings to effect the cut of the chamfering tool.

9. A combined chamfering and burr-removing apparatus for gears, comprising a movable support, a chamfering tool mounted thereon, means for moving said support to effect a chamfering cut on one end of a tooth of a gear, and a burr-removing tool movably mounted on said support in position to engage said end face so that, as the support is moved to effect the cut of the chamfering tool, the burr-removing tool is moved, by contact with the end face of the gear, along said end face to remove a burr from said end face.

10. A combined chamfering and burr-removing apparatus comprising a movable support, a chamfering tool mounted on said support, a burr-removing tool also mounted on said support, and means whereby movement of said support imparts cutting movements both to the chamfering and burr-removing tools.

11. The combination in a gear-cutting machine having tool mechanism for cutting longitudinally inclined tooth spaces of a gear blank and chamfering mechanism operable alternately with the tool mechanism and adapted to chamfer opposite ends of teeth bounding the tooth spaces, said chamfering mechanism comprising a pair of oscillatable tools adapted to cut on movements from the ends of the gear teeth inwardly and means for simultaneously actuating said tools, of a burr-removing tool mounted to swing with one of said tools but also to move independently thereof, said burr-removing tool being so positioned as to remove a burr from an end of a tooth space during movement of the chamfering tool.

12. The combination in a gear cutting machine having means for cutting tooth spaces of a gear, of means operable in timed relation with the cutting means and after each tooth space is cut, to remove the burr formed at the end of the tooth space by the cutting means.

13. The combination in a gear-cutting machine having tool mechanism for cutting tooth spaces of a gear blank, of mechanism for removing burrs formed by the tool mechanism at the ends of the tooth spaces, said last named mechanism being operable alternately with the cutting mechanism.

14. Mechanism for chamfering and removing burrs from gears comprising a work support, a chamfering tool, a burr-removing tool, means for actuating the chamfering tool to chamfer a side of a tooth of a gear, and means whereby the movement of the chamfering tool in the chamfering operation actuates the burr-removing tool to remove a burr from one end of the adjoining tooth space of the gear.

15. Mechanism for chamfering and removing burrs from gears comprising a work support, a chamfering tool movably mounted in position to engage and chamfer a side of a tooth of the gear, a burr-removing tool movably mounted in position to engage an end face of the gear and move along the same to scrape the burrs formed at the bottoms of the tooth spaces off the gear, means for actuating the chamfering tool, and means whereby the movement of the chamfering tool actuates the burr-removing tool.

16. Mechanism for chamfering and removing burrs from gears comprising a work support, a chamfering tool, a burr-removing tool, means for effecting cutting movements of the chamfering tool to chamfer the teeth of the gear, and means connecting the chamfering tool to the burr-removing tool so that on cutting movements of the chamfering tool, the burr-removing tool is brought into engagement with an end-face of the gear and is forced to travel along said end face to scrape off the burr formed on the gear at the bottom of a tooth space.

17. Mechanism for chamfering and removing burrs from gears comprising a work support, a chamfering tool, a burr-removing tool, means for actuating the chamfering tool to chamfer a side of the teeth of the gear, and means whereby the relative movement between the chamfering tool and the gear in a chamfering operation actuates the burr-removing tool.

18. Mechanism for removing burrs from gears comprising a work support, a reciprocable support, a burr-removing tool movably mounted on the reciprocable support in position to engage an end face of a gear and travel along the same on movement of the reciprocable support, and means for actuating said reciprocable support.

19. The combination in a gear cutting machine having a tool mechanism and means for actuating the tool mechanism and means for producing relative movements of feed between the tool mechanism and the gear blank to cut the tooth spaces in the blank and for producing relative movements of withdrawal between the tool mechanism and the blank when the tooth spaces have been completed, and means for indexing the blank during the periods of withdrawal, of means also operative during the periods of withdrawal for removing burrs from the tooth spaces.

20. The combination in a gear cutting machine having a rotary face-mill gear cutter, means for rotating the cutter, means for producing relative movements of feed between the cutter and blank to cut tooth spaces on the blank and for producing relative movements of withdrawal between the cutter and blank when the tooth spaces have been completed, and means for indexing the blank during the periods of withdrawal, of means also operative during the periods of withdrawal for removing burrs from the tooth spaces.

21. Mechanism for removing burrs from gears comprising a work support, a swinging arm, a burr-removing tool movably mounted on said arm in position to engage an end face of a tooth of a gear when the arm is swung in one direction, and means for resiliently holding the burr-removing tool in operative position so that during continued swing of the arm in the described direction, the burr-removing tool is moved, by contact with the end face of the gear, along said end face to remove a burr from said end face.

ROBERT S. CONDON.